US010703850B2

(12) United States Patent
Chayama et al.

(10) Patent No.: US 10,703,850 B2
(45) Date of Patent: Jul. 7, 2020

(54) RESIN COMPOSITION

(71) Applicant: TORAY INDUSTRIES, INC., Tokyo (JP)

(72) Inventors: Natsuko Chayama, Otsu (JP); Tomoyuki Yuba, Otsu (JP); Yuma Sugisaki, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 93 days.

(21) Appl. No.: 16/063,415

(22) PCT Filed: Dec. 19, 2016

(86) PCT No.: PCT/JP2016/087712
§ 371 (c)(1),
(2) Date: Jun. 18, 2018

(87) PCT Pub. No.: WO2017/110710
PCT Pub. Date: Jun. 29, 2017

(65) Prior Publication Data
US 2018/0371146 A1 Dec. 27, 2018

(30) Foreign Application Priority Data

Dec. 25, 2015 (JP) ................. 2015-253478

(51) Int. Cl.
*C08G 12/08* (2006.01)
*C08G 18/08* (2006.01)
(Continued)

(52) U.S. Cl.
CPC ......... *C08G 12/08* (2013.01); *C08G 18/0823* (2013.01); *C08G 18/3243* (2013.01);
(Continued)

(58) Field of Classification Search
CPC ...... C08G 8/04; C08G 12/08; C08G 18/0823; C08G 18/3243; C08G 18/3821; C08G 18/3872; C08G 18/7614; C08G 18/7621; C08G 18/7671; C08G 18/7678; C08G 69/32; C08G 73/105; C08G 73/1067;
(Continued)

(56) References Cited

U.S. PATENT DOCUMENTS 3,386,965 A * 6/1968 Huffman ................ C08G 69/32
528/331
4,722,963 A 2/1988 Whyzmuzis
(Continued)

FOREIGN PATENT DOCUMENTS

| JP | 42-14469 B | 8/1967 |
|---|---|---|
| JP | 44-19555 B | 8/1969 |
| JP | 44-19556 B | 8/1969 |
| JP | 7-78122 B2 | 8/1995 |
| JP | 8-3445 A | 1/1996 |
| JP | 2002-226582 A | 8/2002 |
| JP | 2002-280019 A | 9/2002 |
| JP | 2009-199761 A | 9/2009 |
| JP | 2009-245773 A | 10/2009 |
| JP | 2011-137063 A | 7/2011 |

OTHER PUBLICATIONS

Machine translation of JP 2002-280019, published on Sep. 27, 2002 (Year: 2002).*

(Continued)

*Primary Examiner* — Anca Eoff
(74) *Attorney, Agent, or Firm* — Birch, Stewart, Kolasch & Birch LLP

(57) ABSTRACT

A resin composition contains: (a) a resin which constitutes a polymer having a structure represented by any one of the following general formulae (1) to (3) below and/or a copolymer having the structure; and (b) a basic compound,

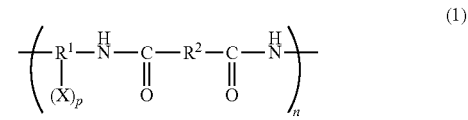

wherein $R^1$ is a $C_4$-$C_{30}$ organic group, $R^2$ is a divalent $C_4$-$C_{30}$ organic group, X is a sulfonic group, hydroxy group, or carboxy group, p is 1 to 4, and n is 2 to 100,000;

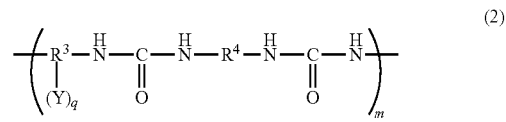

wherein $R^3$ is a $C_4$-$C_{30}$ organic group, $R^4$ is a divalent $C_4$-$C_{30}$ organic group, Y is a sulfonic group, hydroxy group, or carboxy group, q is 1 to 4, and m is 2 to 100,000;

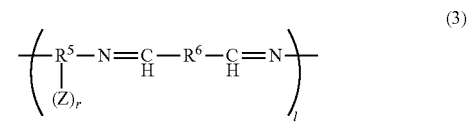

wherein $R^5$ represents a $C_4$-$C_{30}$ organic group, $R^6$ is a divalent $C_4$-$C_{30}$ organic group, Z is a sulfonic group, hydroxy group, or carboxy group, r is 1 to 4, and l is 2 to 100,000.

16 Claims, No Drawings

(51) Int. Cl.
| | |
|---|---|
| C08G 18/32 | (2006.01) |
| C08G 18/38 | (2006.01) |
| C08G 18/76 | (2006.01) |
| C08G 69/32 | (2006.01) |
| C08G 73/10 | (2006.01) |
| H01M 4/131 | (2010.01) |
| H01M 4/1391 | (2010.01) |
| H01M 4/62 | (2006.01) |
| H01M 10/0525 | (2010.01) |
| C08K 3/00 | (2018.01) |
| H01G 11/38 | (2013.01) |
| C08K 3/22 | (2006.01) |
| C08K 3/26 | (2006.01) |
| C08K 5/17 | (2006.01) |
| C08K 5/3432 | (2006.01) |
| H01G 9/00 | (2006.01) |
| H01G 9/042 | (2006.01) |
| H01M 4/04 | (2006.01) |
| H01M 4/485 | (2010.01) |
| H01M 10/0585 | (2010.01) |
| C08G 8/04 | (2006.01) |

(52) U.S. Cl.
CPC ..... *C08G 18/3821* (2013.01); *C08G 18/3872* (2013.01); *C08G 18/7614* (2013.01); *C08G 18/7621* (2013.01); *C08G 18/7671* (2013.01); *C08G 18/7678* (2013.01); *C08G 69/32* (2013.01); *C08G 73/105* (2013.01); *C08G 73/1067* (2013.01); *C08G 73/1071* (2013.01); *C08K 3/00* (2013.01); *C08K 3/22* (2013.01); *C08K 3/26* (2013.01); *C08K 5/17* (2013.01); *C08K 5/3432* (2013.01); *H01G 9/0029* (2013.01); *H01G 9/042* (2013.01); *H01G 11/38* (2013.01); *H01M 4/0402* (2013.01); *H01M 4/131* (2013.01); *H01M 4/1391* (2013.01); *H01M 4/485* (2013.01); *H01M 4/622* (2013.01); *H01M 4/623* (2013.01); *H01M 4/625* (2013.01); *C08G 8/04* (2013.01); *C08K 2003/262* (2013.01); *H01M 10/0525* (2013.01); *H01M 10/0585* (2013.01); *Y02E 60/122* (2013.01); *Y02T 10/7011* (2013.01)

(58) Field of Classification Search
CPC ........ C08G 73/1071; C08K 3/00; C08K 3/22; C08K 3/26; C08K 5/17; C08K 5/32; C08K 5/34; C08K 2003/262; H01G 9/0029; H01G 9/042; H01G 11/38; H01M 4/0402; H01M 4/131; H01M 4/1391; H01M 4/485; H01M 4/622; H01M 4/623; H01M 4/625; H01M 10/0525; H01M 10/0585; Y02E 60/122; Y02T 10/7011
See application file for complete search history.

(56) References Cited

U.S. PATENT DOCUMENTS

| | | | | |
|---|---|---|---|---|
| 5,081,212 | A * | 1/1992 | Prass | B05D 1/202 428/411.1 |
| 2002/0036677 | A1* | 3/2002 | Watanabe | B41J 2/1404 347/65 |
| 2004/0247975 | A1* | 12/2004 | Song | H01M 4/926 429/483 |
| 2007/0238000 | A1* | 10/2007 | Koyama | C08J 5/2256 429/483 |
| 2013/0184385 | A1* | 7/2013 | Ogihara | H01M 4/134 524/104 |
| 2013/0273423 | A1* | 10/2013 | Jeong | H01M 4/622 429/217 |

OTHER PUBLICATIONS

Timofeeva et al., "Synthesis and Investigation of New Water Soluble Sulfonated Rigid-Rod Polynaphthoyleneimide," Macromol, Symp., vol. 106, 1996, pp. 345-351.

* cited by examiner

RESIN COMPOSITION

TECHNICAL FIELD

The present invention relates to a resin composition, particularly to a resin composition which can be preferably applied to an aqueous binder for use in electrodes for power storage devices.

BACKGROUND ART

Lithium-ion batteries as rechargeable high capacity batteries have enabled electronic devices to achieve high performance and long-term operation. Furthermore, lithium-ion batteries, which are installed in vehicles and the like, are the most likely batteries for hybrid and electric vehicles. Currently broadly used lithium-ion batteries have a positive electrode that is prepared by applying a slurry comprising an active material such as lithium cobalt oxide and a binder such as polyvinylidene difluoride (PVDF) to aluminium foil and a negative electrode that is prepared by applying a slurry comprising a carbon-based active material and a binder such as PVDF or styrene-butadiene rubber (SBR) to copper foil.

To further increase the capacity of lithium-ion batteries, use of silicon, germanium, or tin as a negative electrode active material has been studied (see, for example, Patent Document 1). The ability of a negative electrode active material using silicon, germanium, tin, or the like to accept a large amount of lithium ions causes a large volume change in the material between complete charge and complete discharge of batteries. Because a binder such as PVDF, SBR, or the like cannot follow the volume change of the active material, it is contemplated that polyimide resins having more excellent mechanical properties are used as a binder for negative electrodes (see, for example, Patent Document 2). However, these resins can be dissolved only in organic solvents such as N-methylpyrrolidone and N,N'-dimethylacetamide, which causes a problem of a large environmental impact. Thus, use of the resin mixed in an aqueous solvent as an aqueous binder is being studied.

For an aqueous solution of a polyimide resin, an aqueous solution of a polyimide precursor to which an amine is added (see, for example, Patent Documents 3 and 4) and an aqueous mixture solution of a polyimide in which any of hydroxy group, carboxy group and sulfonic group is introduced to side chain positions and a hydroxide of an alkali metal are known (see, for example, Patent Document 5 and Non-Patent Document 1).

For an aqueous solution of a polyamide resin, an aqueous solution of a polyamide resin prepared by polymerization using an excess amount of an acid component rather than an amine component and a resin comprising ammonia or an organic amine is known (see, for example, Patent Document 6).

PRIOR ART DOCUMENTS

Patent Documents

Patent Document 1: Japanese Unexamined Patent Publication No. 2009-199761
Patent Document 2: Japanese Unexamined Patent Publication No. 2009-245773
Patent Document 3: Japanese Unexamined Patent Publication No. Hei8-3445
Patent Document 4: Japanese Unexamined Patent Publication No. 2002-226582
Patent Document 5: Japanese Unexamined Patent Publication No. 2011-137063
Patent Document 6: Japanese Examined Patent Publication No. Hei7-78122

Non-Patent Document

Non-Patent Document 1: Macromol Symposia, 1996, 106, p. 345-351

SUMMARY OF THE INVENTION

Problems to be Solved by the Invention

However, the aqueous solution of the polyimide precursor was susceptible to hydrolysis and therefore the stability of the solution was insufficient. The aqueous solution of the polyimide resin was less soluble and therefore the stability of the solution was insufficient. Furthermore, ionization of side chains in the polyimide resin inhibited formation of hydrogen bonds by the side chains, which in turn resulted in a problem of insufficient adhering properties to substrates. The aqueous solution of the polyamide resin prepared by using an excess amount of an acid component rather than an amine component had insufficient binding properties because the molecular weight of the resin was low due to its structural characteristics.

In view of the above-mentioned problems, an object of the present invention is to provide a resin composition that achieves high solution stability when used as an aqueous binder and that has sufficient adhering and binding properties to substrates.

Means for Solving the Problems

The present invention is a resin composition containing (a) a resin comprising a polymer having a structure represented by at least any one of the following general formulae (1) to (3) and/or a copolymer having the structure, and (b) a basic compound.

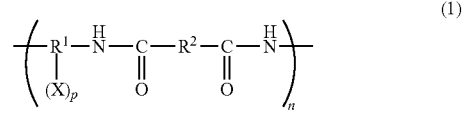

(In the above general formula (1), $R^1$ represents a $C_4$-$C_{30}$ organic group having a valence of two to six, $R^2$ represents a divalent $C_4$-$C_{30}$ organic group, X represents a sulfonic group, hydroxy group, or carboxy group, p represents an integer of 0 to 4, and n is within the range from 2 to 100,000.)

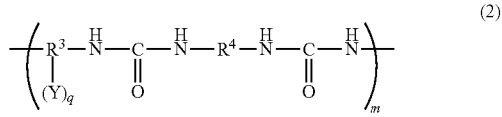

(In the above general formula (2), $R^3$ represents a $C_4$-$C_{30}$ organic group having a valence of two to six, $R^4$ represents a divalent $C_4$-$C_{30}$ organic group, Y represents a sulfonic group, hydroxy group, or carboxy group, q represents an integer of 0 to 4, and m is within the range from 2 to 100,000.)

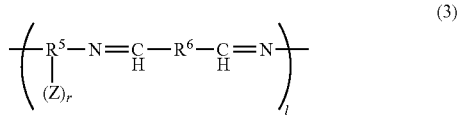

(In the above general formula (3), $R^5$ represents a $C_4$-$C_{30}$ organic group having a valence of two to six, $R^6$ represents a divalent $C_4$-$C_{30}$ organic group, Z represents a sulfonic group, hydroxy group, or carboxy group, r represents an integer of 0 to 4, and l is within the range from 2 to 100,000.)

Effect of the Invention

According to the present invention, a resin composition that achieves high solution stability when used as an aqueous binder and that has sufficient adhering and binding properties to substrates can be obtained.

MODE FOR CARRYING OUT THE INVENTION

The present invention is a resin composition containing (a) a resin comprising a polymer having a structure represented by at least any one of the above general formulae (1) to (3) and/or a copolymer having the structure, and (b) a basic compound.

The structures represented by the above general formulae (1) to (3) have a sulfonic group, hydroxy group, or carboxy group at the side chain position. Due to the presence of any of the acidic functional groups at the side chain position, a resin which is well dispersible in water-soluble solvents or water can be obtained. The copolymerization ratio and the sequence of monomer units in a resin are not particularly limited as long as the resin comprises at least any one of structures represented by the above general formulae (1) to (3), but the ratio of the structure(s) in the total repeating units is preferably not less than 50% by mole to improve the solubility and dispersibility of the resin in water-soluble solvents. More preferably, it is not less than 70% by mole, and further preferably not less than 90% by mole. A resin comprising a structure represented by the above general formula (1) is particularly preferred. For each polymer chain, all of l, m, and n in the general formulae (1) to (3) represent an integer, but actual values of l, m and n obtained by analyzing the polymer as a whole may not be an integer.

Now, resins comprising the respective structures will be described below.

A resin comprising a structure represented by the general formula (1) can be obtained by polycondensation of a diamine having a sulfonic group, hydroxy group, or carboxy group within its structure and a dicarboxylic acid in a solvent. In the general formula (1), R' represents a diamine residue, and $R^2$ represents a dicarboxylic acid residue.

Examples of the diamine include p-phenylenediamine, m-phenylenediamine, 3,3'-diaminodiphenyl ether, 4,4'-diaminodiphenyl ether, 3,4'-diaminodiphenyl ether, 4,4'-diaminodiphenylmethane, 3,3'-diaminodiphenyl sulfone, 4,4'-diaminodiphenyl sulfone, 3,3'-diaminodiphenyl sulfide, 4,4'-diaminodiphenyl sulfide, 1,3-bis(4-aminophenoxy)benzene, 1,4-bis(4-aminophenoxy)benzene, 2,2-bis(trifluoromethyl)benzidine, 9,9'-bis(4-aminophenyl)fluorene, hexamethylenediamine, 1,3-bis(3-aminopropyltetramethyldisiloxane), and the like, or those obtained by replacing one to four hydrogen atoms of these compounds with a hydroxy group(s), a carboxy group(s), or a sulfonic group(s).

Moreover, to render the resin of the present invention soluble both in organic solvents and in water-soluble solvents, each of $R^1$—$(X)_p$ in the general formula (1), $R^3$—$(Y)_q$ in the general formula (2), and $R^5$—$(Z)_r$ in the general formula (3) is preferably a diamine residue represented by at least either of the following general formulae (4) and (5) at not less than 20% by mole, furthermore not less than 50%, and particularly not less than 80% by mole. The presence these residues at a higher ratio can ensure solubility both in organic solvents and in water-soluble solvents.

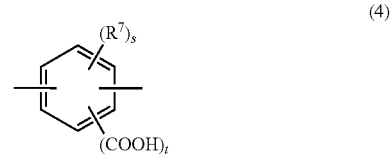

($R^7$ represents a halogen atom or a monovalent $C_1$-$C_8$ organic group, s represents an integer of 0 to 3, and t represents an integer of 1 or 2.)

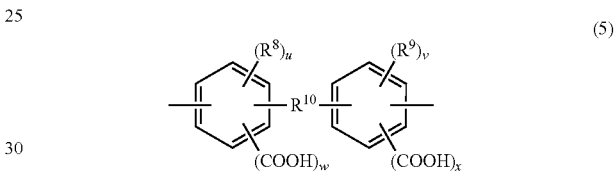

($R^8$ and $R^9$ each independently represents a halogen atom or a monovalent $C_1$-$C_8$ organic group, u and v each represents an integer of 0 to 3, w and x each represents an integer of 1 or 2, and $R^{10}$ represents a single bond, O, S, NH, $SO_2$, CO, or a divalent $C_1$-$C_3$ organic group, or a divalent cross-linking structure formed by linking two or more thereof.)

Examples of diamines having a diamine residue represented by the above general formula (4) or (5) include 3,5-diaminobenzoic acid, 3,4-diaminobenzoic acid, 5,5'-methylenebis(2-aminobenzoic acid), bis(3-amino-4-carboxyphenyl) sulfone, 2,2-bis(3-amino-4-carboxyphenyl)propane, 2,2-bis(3-amino-5-carboxyphenyl)propane, 2,2-bis(4-amino-3-carboxyphenyl)propane, 2,2-bis(3-amino-4-carboxyphenyl)hexafluoropropane, 2,2-bis(3-amino-5-carboxyphenyl)hexafluoropropane, 2,2-bis(4-amino-3-carboxyphenyl)hexafluoropropane, bis(3-amino-4-carboxyphenyl) ether, and the like.

A resin comprising the diamine residue represented by the general formula (4) at a higher ratio has excellent binding properties as a binder, whereas a resin comprising the diamine residue represented by the general formula (5) at a higher ratio has excellent solubility in solvents. To achieve both excellent binding properties and excellent solubility, as for the molar ratio between the general formulae (4) and (5), the ratio of the diamine residue represented by the general formula (4) is preferably 0.1-100,000, more preferably 1-10,000 with respect to 100 of the diamine residue represented by the general formula (5).

Examples of the dicarboxylic acid include terephthalic acid, isophthalic acid, diphenyl ether dicarboxylic acid, naphthalenedicarboxylic acid, diphenylsulfonedicarboxylic acid, and the like. Two or more of the dicarboxylic acids may be used. To improve the solubility and dispersibility of the resin in water-soluble solvents, a dicarboxylic acid having a dicarboxylic acid residue represented by the following general formula (6) is preferably used at not less than 20% by mole in the total dicarboxylic acids. This can result in obtaining a resin having a structure represented by the following general formulae (6) as $R^2$ in the general formula (1) at not less than 20% by mole, furthermore not less than 50% by mole, particularly not less than 80% by mole.

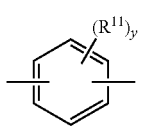
(6)

(In the above general formula (6), each $R^{11}$ independently represents a halogen atom or a monovalent $C_1$-$C_8$ organic group, and y represents an integer of 0 to 4.)

Similarly to conventional polycondensation reactions, as the charging ratio (molar ratio) between a diamine and a dicarboxylic acid gets closer to 1:1, the degree of polymerization and the weight average molecular weight of a resulting polymer are increased. In the present invention, the weight average molecular weight is preferably not less than 10,000 and not more than 150,000. A polymer having a weight average molecular weight of not less than 10,000 as determined in terms of polystyrene by GPC (gel permeation chromatography) can have sufficient binding properties as a binder. On the other hand, a polymer having a weight average molecular weight of not more than 150,000 can maintain high solubility in solvents. To obtain a polymer having the above-described weight average molecular weight, the charging ratio (molar ratio) of a diamine to a dicarboxylic acid preferably ranges from 100:50 to 100:150.

The solvent used in the above polycondensation reaction is not particularly limited as long as the produced resin is soluble, but examples of the solvent which can be preferably used include aprotic polar solvents such as N-methyl-2-pyrrolidone, N-methylcaprolactam, N,N-dimethylacetamide, N,N-dimethylformamide, dimethyl sulfoxide, γ-butyrolactone, dimethylimidazoline, and the like; phenolic solvents such as phenol, m-cresol, chlorophenol, nitrophenol, and the like; and phosphorus solvents such as polyphosphoric acid, phosphoric acid to which phosphorous pentaoxide is added, and the like.

In general, a polymer is obtained by allowing an acid chloride or active ester of a dicarboxylic acid to react with a diamine in any of the solvents at a temperature of not higher than 30° C. Moreover, a base such as triethylamine, pyridine, or the like may be added as a catalyst during the reaction. Subsequently, the reaction mixture is poured into water or the like to precipitate the resin and the precipitated resin is then dried, by which the polymer can be obtained as a solid.

A resin comprising a structure represented by the general formula (2) can be obtained by polycondensation of a diamine having a sulfonic group, hydroxy group, or carboxy group within its structure and a diisocyanate in a solvent. In the general formula (2), $R^3$ represents a diamine residue, and $R^4$ represents a diisocyanate residue.

Examples of the diamine can include those indicated as the diamine in the resin comprising a structure represented by the general formula (1).

Examples of the diisocyanate include 1,3-phenylene diisocyanate, 1,4-phenylene diisocyanate, 2,4-toluene diisocyanate, 2,6-toluene diisocyanate, 4,4'-diphenylmethane diisocyanate, 1,5-diisocyanatonaphthalene, and the like. To improve the solubility and dispersibility of the resin in water-soluble solvents, a diisocyanate having a diisocyanate residue represented by the general formula (6) is preferably contained at not less than 20% by mole in the total diisocyanates. This can result in obtaining a resin having a structure represented by the general formula (6) as $R^4$ in the general formula (2) at not less than 20% by mole, furthermore not less than 50% by mole, particularly not less than 80% by mole. A higher ratio of the diisocyanate residue represented by the general formula (6) in the resin can increase the solution stability when the resin is used as an aqueous binder.

Similarly to the resin comprising a structure represented by the general formula (1), as for the charging ratio (molar ratio) between a diamine and a diisocyanate, the diisocyanate is preferably within a range of 50-150 with respect to 100 of the diamine.

Examples of the solvent used in the above polycondensation reaction can include those indicated as the solvent used in the polycondensation reaction for the above resin.

In general, a polymer is obtained by allowing a diamine to react with a diisocyanate in any of the solvents at a temperature of not higher than 30° C. A base such as triethylamine, pyridine, or the like may be added as a catalyst during the reaction. Subsequently, the reaction mixture is poured into water or the like to precipitate the resin and the precipitated resin is then dried, by which the polymer can be obtained as a solid.

A resin comprising a structure represented by the general formula (3) can be obtained by polycondensation of a diamine having a sulfonic group, hydroxy group, or carboxy group within its structure and a dialdehyde in a solvent. In the general formula (3), $R^5$ represents a diamine residue, and $R^6$ represents a dialdehyde residue.

Examples of the diamine include those indicated as the diamine in the polyamide resin.

Examples of the dialdehyde include isophthalaldehyde, phthaldialdehyde, 4,4'-biphenyldicarboxaldehyde, 2,2'-oxybenzaldehyde, and the like. To improve the solubility and dispersibility of the resin in water-soluble solvents, a dialdehyde having the dialdehyde residue represented by the general formula (6) is preferably contained at not less than 20% by mole in the total dialdehydes. This can result in obtaining a resin having a structure represented by the general formula (6) as $R^6$ in the general formula (3) at not less than 20% by mole, furthermore not less than 50% by mole, particularly not less than 80% by mole. A higher ratio of the dialdehyde residue represented by the general formula (6) in the resin can increase the solution stability when the resin is used as an aqueous binder.

Similarly to the resin comprising a structure represented by the general formula (1), as for the charging ratio (molar ratio) between a diamine and a dialdehyde, the dialdehyde is preferably within a range of 50-150 with respect to 100 of the diamine.

Examples of the solvent used in the above polycondensation reaction can include those indicated as the solvent used in the polycondensation reaction for the above resin.

In general, a polymer is obtained by allowing a diamine to react with a dialdehyde in any of the solvents at a temperature of not higher than 30° C. A base such as triethylamine, pyridine, or the like may be added as a catalyst during the reaction. Subsequently, the reaction mixture is poured into water or the like to precipitate the resin and the precipitated resin is then dried, by which the polymer can be obtained as a solid.

The presence of a resin comprising a polymer having a structure represented by any one of the above general formulae (1) to (3) and/or a copolymer having the structure and of a basic compound causes salt formation between a sulfonic group(s), a hydroxy group(s), or a carboxy group(s) within the structure and the basic compound, which can in turn result in obtaining a resin composition having an excellent solubility and dispersion stability in water.

Examples of the basic compound include hydroxides of alkali metals, carbonates of alkali metals, organic amines, and the like.

Examples of the hydroxides of alkali metals include lithium hydroxide, sodium hydroxide, potassium hydroxide, rubidium hydroxide, cesium hydroxide, and the like. Two or more of the hydroxides may be contained. Lithium hydroxide, sodium hydroxide, and potassium hydroxide are preferred to increase the solubility and the stability.

Examples of the carbonates of alkali metals can include lithium carbonate, lithium hydrogen carbonate, sodium carbonate, sodium hydrogen carbonate, potassium carbonate, potassium hydrogen carbonate, rubidium hydrogen carbonate, cesium carbonate, cesium hydrogen carbonate, and sodium potassium carbonate. Two or more of the carbonates may be contained. Sodium carbonate, sodium hydrogen carbonate, potassium carbonate, potassium hydrogen carbonate, and sodium potassium carbonate are preferred in terms of solubility, stability, and the like.

Examples of the organic amines include aliphatic tertiary amines such as trimethylamine, triethylamine, triisopropylamine, tributylamine, triethanolamine, and N-methylethanolamine; aromatic amines such as pyridine, N,N-dimethylaminopyridine, and lutidine; and quaternary ammonium salts such as tetramethylammonium hydroxide and tetraethylammonium hydroxide; and the like. Two or more of the organic amines may be used.

When the resin of the present invention is used as an aqueous solution, the content of the basic compound is preferably not less than 0.2 mole equivalents, more preferably not less than 0.5 mole equivalents, relative to the acidic functional groups in the resin, at which the resin can be well dissolved. Moreover, the content of the basic compound is preferably not more than 4 mole equivalents, more preferably not more than 3 mole equivalents, at which degradation of the resin can be prevented or, if the resin is applied as a coated film, crack generation on the coated film can be prevented.

The resin composition of the present invention can be blended with any solvent and additive and then used, and the resin composition of the present invention can be dissolved or dispersed in a solvent and then used as a binder composition.

A solvent comprising water as the primary ingredient is preferably used because the environmental impact can be reduced when it is used as a binder. Furthermore, the composition is preferably dissolved into an aqueous solution to increase the storage stability of the composition.

An aqueous solution or dispersion in which the resin composition of the present invention is used preferably contains 50 to 1,000,000 parts by mass of water with respect to 100 parts by mass of the above-described resin. In general, from the viewpoint of coating properties, water is contained preferably at not less than 50 parts by mass, more preferably at not less than 100 parts by mass, with respect to 100 parts by mass of the above-described resin, at which gelling of the resin can be reduced. Water is contained preferably at not more than 100,000 parts by mass, more preferably at not more than 3,000 parts by mass, with respect to 100 parts by mass of the above-described resin, at which degradation of the resin can be reduced.

Moreover, the viscosity of the aqueous solution is preferably within the range from 1 mPS·s to 100 PS·s at 25° C. in terms of workability.

The aqueous solution and the aqueous dispersion may contain a surfactant and the like, which can result in improved coating properties. Moreover, a solvent, including lower alcohols such as ethanol and isopropyl alcohol, and polyols such as ethylene glycol and propylene glycol, may also be contained. The content of the solvent is preferably not more than 50% by mass, more preferably not more than 10% by mass, with respect to the overall amount of the aqueous solution.

The method to prepare the aqueous solution and the aqueous dispersion is not particularly limited, but a method comprising dissolving a predetermined amount of the basic compound in water, and then gradually dissolving the resin powder in the resulting solution is preferable in terms of safety. If the neutralization reaction proceeds slowly, the reaction may be heated by water bath or oil bath at a temperature of around 30-110° C. or ultrasonic treatment may be applied to the reaction. After completion of the dissolution, water may be added to the resulting solution or the resulting solution may be concentrated to adjust the viscosity to a predetermined level.

The resin composition of the present invention can also be used as slurry by adding a filler to the resin composition. Improved mechanical strength and heat tolerance can be expected from the addition of the filler. Furthermore, addition of conductive particles or a high-refractive or low-refractive filler to the resin composition may also allow the resin composition to be used in electronic materials and in optical materials.

Examples of the filler which is added to the resin composition of the present invention include compounds containing atoms of carbon, silicon, tin, germanium, titanium, iron, cobalt, nickel, manganese, and the like. When any of these compounds is used as a filler, the filler will play a role as an active material. Thus, a slurry prepared by adding a filler to the resin of the present invention can be used as a slurry for electrodes in secondary batteries and capacitors.

Examples of the filler for a positive electrode include lithium iron phosphate, lithium cobalt oxide, lithium nickel oxide, lithium manganese oxide, active carbon, carbon nanotube, and the like.

Examples of the filler for a negative electrode include silicon, silicon oxide, silicon carbide, tin, tin oxide, germanium, lithium titanate, hard carbon, soft carbon, active carbon, carbon nanotube, and the like. Particularly, when a filler comprising silicon and silicon oxide at not less than 10% by mass in total, taking the overall amount of the filler as 100% by mass, is used, the volume expansion of the active material during charging is large in size and, therefore, a resin having a high mechanical strength as the above-described resin is preferably used as a binder to prevent pulverization of the active material. Moreover, when lithium titanate is used as a filler, secondary batteries and capacitors with high-rate performance can be obtained.

The content of the filler in the slurry according to the present invention is preferably not less than 0.01 parts by mass, more preferably not less than 0.1 parts by mass, with respect to 100 parts by mass of the resin, at which mechanical strength and heat tolerance can be improved. Moreover, the content of the filler is preferably not more than 100,000 parts by mass, more preferably not more than 10,000 parts by mass, at which the strength of coated film can be maintained.

The above-described slurry can be obtained by, for example, dissolving or dispersing the resin in water or a solvent, adding a filler and other optional components to the resulting solution or dispersion, which is then mixed homogeneously. Examples of the mixing method include methods using a planetary mixer, planetary centrifugal mixer, triple roll mill, ball mill, mechanical stirrer, high-speed thin film mixer, or the like.

The above-described slurry can be applied on either side or both sides of a support substrate and then dried to obtain a filler-containing resin film. Metallic foil such as copper foil, aluminium foil, and stainless foil, silicon substrate, glass substrate, plastic film, and the like are preferably used as a support substrate. Examples of the application method include methods using a roll coater, slit die coater, bar coater, comma coater, spin coater, or the like. The drying temperature is preferably at not lower than 30° C., more preferably at not lower than 50° C., to completely remove water. Moreover, the drying temperature is preferably at not higher than 500° C., more preferably at not higher than 200° C., to prevent crack generation on electrodes.

Moreover, if the slurry is used as a slurry for electrode, the slurry may also contain a conductive additive such as acetylene black, ketjen black, carbon nanotube, or the like. The presence of any of these conductive additives can increase charge and discharge rates.

To achieve both an excellent conductivity and a high capacity, the content of the conductive additive is preferably from 0.1 to 20 parts by mass with respect to 100 parts by mass of the active material. Moreover, an aqueous solution of sodium carboxymethyl cellulose may also be contained to adjust the viscosity of the slurry. To maintain the capacity, the content of the material is preferably not more than 50 parts by mass with respect to 100 parts by mass of the active material.

The slurry for electrode can be applied on either side or both sides of a current collector such as copper foil, aluminium foil, stainless foil, or the like and then dried to obtain an electrode for a secondary battery or a capacitor. Multiple layers of the thus-prepared positive and negative electrodes can be stacked with a separator inserted therebetween, housed together with an electrolytic solution, and then sealed in a casing such as a metal case to obtain a power storage device such as secondary battery or capacitor. Examples of the separator include microporous films, nonwoven fabrics, and the like, made of polyolefin such as polyethylene or polypropylene; or cellulose, polyphenylene sulfide, aramid, polyimide, or the like. The surface of the separator may be coated with ceramics or the like to increase the heat tolerance. As a solvent for the electrolytic solution, a carbonate compound such as propylene carbonate, ethylene carbonate, dimethyl carbonate, ethyl methyl carbonate, or vinylene carbonate; acetonitrile, sulfolane, γ-butyrolactone, or the like can be used. Two or more of these solvents may be used. Examples of the electrolyte include lithium salts such as lithium hexafluorophosphate, lithium tetrafluoroborate, and lithium perchlorate; ammonium salts such as tetraethylammonium tetrafluoroborate and triethylmethylammonium tetrafluoroborate; and the like.

EXAMPLES

The present invention will be further described in details by way of examples below. However, the present invention is not limited in any way by these examples. Measurement of weight average molecular weight and evaluation of solubility, storage stability and coated film in resins of the respective examples and comparative examples were performed by the following methods.

<Measurement of the Weight Average Molecular Weight of a Resin>

The molecular weight of a resin was measured by using the GPC (gel permeation chromatography) machine Waters 2690-996 (manufactured by Nihon Waters K.K.) and N-methyl-2-pyrrolidone (hereinafter referred to as NMP) as a developing solvent to calculate the weight average molecular weight (Mw) in terms of polystyrene.

<Evaluation of the Solubility and Dispersibility and the Storage Stability>

Aqueous solutions or dispersions prepared in the respective examples and comparative examples were visually inspected to verify the initial solubility and dispersibility. The physical condition of a resin was recorded as follows: a resin which formed an aqueous solution was expressed as dissolved; a resin which formed a stable aqueous dispersion was expressed as uniformly dispersed; a resin which precipitated to the bottom of a container was expressed as precipitated. Furthermore, the dissolved resins and the uniformly dispersed resins were stored at room temperature (25° C.) and in a refrigerator (4° C.) for one month to evaluate the storage stability. Resins which did not show any of separation, gelling, viscosity reduction, and precipitation were indicated by a circle, while in resins which showed any of the changes, the changes which had occurred in the resins were recorded.

<Evaluation of Coated Film (Evaluation of Binding Properties)>

In aqueous dispersions among those aqueous solutions or dispersions of resins prepared in the respective examples and comparative examples, 2 parts by weight of carboxymethyl cellulose (manufactured by Daicel Corporation, #2200) as a thickener was added to 100 parts by weight of the solution. Each of the aqueous solutions or the carboxymethyl cellulose-supplemented aqueous dispersions was applied on aluminium foil with a bar coater. After the application, the aluminium foil was dried at 50° C. for 30 minutes, then heated to 150° C. for 30 minutes and heated at 150° C. for one hour, then cooled down to a temperature of not higher than 50° C. and withdrawn. After the withdrawal, the coated film was visually inspected and the maximum film thickness, with which a coated film was successfully formed without generating crack, was used as an index for evaluation of the coated film.

<Evaluation of Adhering Properties>

Silicon wafers were coated with copper by sputtering and the substrates each having a metallic material layer formed with a thickness of 200 nm (copper-sputtered substrates) were prepared. Each of the aqueous solutions of resins prepared in the respective examples and comparative examples or each of the carboxymethyl cellulose-supplemented aqueous dispersions prepared in the above-described evaluation of coated films was applied on the substrate with a spinner (manufactured by Mikasa Co., Ltd.) and then the resulting substrate was dried on a hot plate set at 120° C. for 3 minutes to produce a film-coated wafer with a film thickness of 8 to 10 μm. The film thickness was measured with a film thickness measuring instrument (manufactured by Dainippon Screen Manufacturing Co., Ltd., Lambda Ace ST-M602J). The obtained film-coated wafers were heat-treated in an inert oven (manufactured by Koyo Thermo Systems Co., Ltd., INH-9) with nitrogen gas flow at an oxygen concentration of not more than 20 ppm, in which the film-coated wafers were heated at 50° C. for 30 minutes, and then heated to 150° C. at a rate of 3.5° C./min and heated at 150° C. for one hour. Incisions were made 2 mm apart to produce a grid of 10 columns and 10 rows on the cured film by using a single edged knife. The obtained sample substrates was used to count the number of peeled cells out of 100 which were tried to be peeled off using Cello-Tape®, and thereby to evaluate the adhesion properties between the metal material and the cured resin film.

Synthesis Example 1: Synthesis of Resin A

In a well-dried four-neck flask, 28.63 g (100 mmol) of 3,3'-dicarboxy-4,4'-diaminodiphenylmethane (manufactured by Wakayama Seika Kogyo Co., trade name "MBAA") was dissolved in 131.79 g of NMP with stirring under nitrogen atmosphere. Subsequently, the flask was cooled on ice, and 20.30 g (100 mmol) of isophthaloyl dichloride (manufactured by Tokyo Chemical Industry Co., Ltd., hereinafter referred to as IPC) dissolved in 15.00 g of NMP was added dropwise to the flask with keeping the temperature of the solution at a temperature of not higher than 30° C. After all the ingredients were added to the flask, the reaction was allowed to proceed at 30° C. for four hours. This solution was poured into 3 L of water, and the obtained precipitation was filtered out and then washed three times with 1.5 L of water. The washed solid was dried in a convection oven at 50° C. for three days to obtain the resin A as a solid, which had a structure represented by the general formula (1), wherein $R^1$—$(X)_p$ in the general formula (1) had a structure represented by the general formula (5) at 100% by mole, and $R^2$ in the general formula (1) had a structure represented by the general formula (6) at 100% by mole. The weight average molecular weight of the resin A was 75000.

Synthesis Example 2: Synthesis of Resin B

In a well-dried four-neck flask, 7.61 g (50 mmol) of 3,5-diaminobenzoic acid (manufactured by Tokyo Chemical Industry Co., Ltd., trade name "3,5-Diaminobenzoic acid", hereinafter referred to as 3,5-DAB) and 10.01 g (50 mmol) of 4,4'-diaminodiphenyl ether (manufactured by Wakayama Seika Kogyo Co., trade name "Ko DA", hereinafter referred to as 4,4'-DAE) were dissolved in 97.55 g of NMP with stirring under nitrogen atmosphere. Subsequently, the flask was cooled on ice, and 19.90 g (98 mmol) of IPC dissolved in 15.00 g of NMP was added dropwise to the flask with keeping the temperature of the solution at a temperature of not higher than 30° C. After all the ingredients were added to the flask, the reaction was allowed to proceed at 30° C. for four hours. This solution was poured into 3 L of water, and the obtained precipitation was filtered out and then washed three times with 1.5 L of water. The washed solid was dried in a convection oven at 50° C. for three days to obtain the resin B as a solid, which had a structure represented by the general formula (1), wherein $R^1$—$(X)_p$ in the general formula (1) had a structure represented by the general formula (4) at 50% by mole and $R^2$ in the general formula (1) had a structure represented by the general formula (6) at 100% by mole. The weight average molecular weight of the resin B was 56000.

Synthesis Example 3: Synthesis of Resin C

In a well-dried four-neck flask, 32.96 g (90 mmol) of 2,2-bis(3-amino-4-hydroxyphenyl)hexafluoropropane (manufactured by AZ Electronic Materials Co., Ltd., trade name "AZ 6F-AP", hereinafter referred to as 6FAP) and 1.52 g (10 mmol) of 3,5-DAB were dissolved in 149.36 g of NMP with stirring under nitrogen atmosphere. Subsequently, the flask was cooled on ice, and 20.30 g (100 mmol) of terephthaloyl dichloride (manufactured by Tokyo Chemical Industry Co., Ltd., hereinafter referred to as TPC) dissolved in 15.00 g of NMP was added dropwise to the flask with keeping the temperature of the solution at a temperature of not higher than 30° C. After all the ingredients were added to the flask, the reaction was allowed to proceed at 30° C. for four hours. This solution was poured into 3 L of water, and the obtained precipitation was filtered out and then washed three times with 1.5 L of water. The washed solid was dried in a convection oven at 50° C. for three days to obtain the resin C as a solid, which had a structure represented by the general formula (1), wherein $R^2$ in the general formula (1) had a structure represented by the general formula (6) at 100% by mole. The weight average molecular weight of the resin C was 80000.

Synthesis Example 4: Synthesis of Resin D

In a well-dried four-neck flask, 22.90 g (80 mmol) of MBAA and 3.60 g (18 mmol) of 4,4'-DAE were dissolved in 140.44 g of NMP with stirring under nitrogen atmosphere. Subsequently, the flask was cooled on ice, and 25.31 g (100 mmol) of 2,6-naphthalenedicarboxylic dichloride (manufactured by Iharanikkei Chemical Industry Co., Ltd., trade name "26NADOC", hereinafter referred to as NDCC) dissolved in 15.00 g of NMP was added dropwise to the flask with keeping the temperature of the solution at a temperature of not higher than 30° C. After all the ingredients were added to the flask, the reaction was allowed to proceed at 30° C. for four hours. This solution was poured into 3 L of water, and the obtained precipitation was filtered out and then washed three times with 1.5 L of water. The washed solid was dried in a convection oven at 50° C. for three days to obtain the resin D as a solid, which had a structure represented by the general formula (1), wherein $R^1$—$(X)_p$ in the general formula (1) had a structure represented by the general formula (5) at 82% by mole. The weight average molecular weight of the resin D was 52000.

Synthesis Example 5: Synthesis of Resin E

In a well-dried four-neck flask, 36.63 g (100 mmol) of 6FAP was dissolved in 170.42 g of NMP with stirring under nitrogen atmosphere. Subsequently, the flask was cooled on ice, and 25.18 g (99.5 mmol) of NDCC dissolved in 15.00 g of NMP was added dropwise to the flask with keeping the temperature of the solution at a temperature of not higher than 30° C. After all the ingredients were added to the flask, the reaction was allowed to proceed at 30° C. for four hours. This solution was poured into 3 L of water, and the obtained precipitation was filtered out and then washed three times with 1.5 L of water. The washed solid was dried in a convection oven at 50° C. for three days to obtain the resin E as a solid, which had a structure represented by the general formula (1). The weight average molecular weight of the resin E was 61000.

Synthesis Example 6: Synthesis of Resin F

In a well-dried four-neck flask, 20.02 g (100 mmol) of 4,4'-DAE was dissolved in 78.35 g of NMP with stirring under nitrogen atmosphere. Subsequently, the flask was cooled on ice, and 20.30 g (100 mmol) of IPC dissolved in 15.00 g of NMP was added dropwise to the flask with keeping the temperature of the solution at a temperature of not higher than 30° C. After all the ingredients were added to the flask, the reaction was allowed to proceed at 30° C. for four hours. This solution was poured into 3 L of water, and the obtained precipitation was filtered out and then washed three times with 1.5 L of water. The washed solid was dried in a convection oven at 50° C. for three days to obtain the resin F as a solid, which does not comprise a structure represented by the general formula (1). The weight average molecular weight of the resin F was 77000.

Synthesis Example 7: Synthesis of Resin G

In a well-dried four-neck flask, 28.63 g (100 mmol) of MBAA was dissolved in 122.88 g of NMP with stirring under nitrogen atmosphere. Subsequently, the flask was cooled on ice, and 17.33 g (99.5 mmol) of toluene diisocyanate (manufactured by Tokyo Chemical Industry Co., Ltd., hereinafter referred to as TDI) dissolved in 15.00 g of NMP was added dropwise to the flask with keeping the temperature of the solution at a temperature of not higher than 30° C. After all the ingredients were added to the flask, the reaction was allowed to proceed at 30° C. for four hours. This solution was poured into 3 L of water, and the obtained precipitation was filtered out and then washed three times with 1.5 L of water. The washed solid was dried in a convection oven at 50° C. for three days to obtain the resin G as a solid, which had a structure represented by the general formula (2), wherein $R^3$—$(Y)_q$ in the general formula (2) had a structure represented by the general formula (5) at 100% by mole and $R^4$ in the general formula (2) had a structure represented by the general formula (6) at 100% by mole. The weight average molecular weight of the resin G was 66000.

Synthesis Example 8: Synthesis of Resin H

In a well-dried four-neck flask, 23.83 g (85 mmol) of 3,3'-diamino-4,4'-dihydroxydiphenyl sulfone (manufactured by AZ Electronic Materials Co., Ltd., trade name "DABS") and 1.35 g (12.5 mmol) of 1,4-phenylenediamine (manufactured by Tokyo Chemical Industry Co., Ltd., trade name "PDA") were dissolved in 112.79 g of NMP with stirring under nitrogen atmosphere. Subsequently, the flask was cooled on ice, and 17.42 g (100 mmol) of TDI dissolved in 15.00 g of NMP was added dropwise to the flask with keeping the temperature of the solution at a temperature of not higher than 30° C. After all the ingredients were added to the flask, the reaction was allowed to proceed at 30° C. for four hours. This solution was poured into 3 L of water, and the obtained precipitation was filtered out and then washed three times with 1.5 L of water. The washed solid was dried in a convection oven at 50° C. for three days to obtain the resin H as a solid, which had a structure represented by the general formula (2), wherein $R^4$ in the general formula (2) had a structure represented by the general formula (6) at 100% by mole. The weight average molecular weight of the resin H was 45000.

Synthesis Example 9: Synthesis of Resin I

In a well-dried four-neck flask, 10.65 g (70 mmol) of 3,5-DAB and 6.01 g (30 mmol) of 4,4'-DAE were dissolved in 110.29 g of NMP with stirring under nitrogen atmosphere. Subsequently, the flask was cooled on ice, and 25.11 g (95 mmol) of 4,4'-diisocyanato-3,3'-dimethylbiphenyl (manufactured by Tokyo Chemical Industry Co., Ltd., hereinafter referred to as TODI) dissolved in 15.00 g of NMP was added dropwise to the flask with keeping the temperature of the solution at a temperature of not higher than 30° C. After all the ingredients were added to the flask, the reaction was allowed to proceed at 30° C. for four hours. This solution was poured into 3 L of water, and the obtained precipitation was filtered out and then washed three times with 1.5 L of water. The washed solid was dried in a convection oven at 50° C. for three days to obtain the resin I as a solid, which had a structure represented by the general formula (2), wherein $R^3$—$(Y)_q$ in the general formula (2) had a structure represented by the general formula (4) at 70% by mole. The weight average molecular weight of the resin I was 32000.

Synthesis Example 10: Synthesis of Resin J

In a well-dried four-neck flask, 20.02 g (100 mmol) of 4,4'-DAE was dissolved in 95.24 g of NMP with stirring under nitrogen atmosphere. Subsequently, the flask was cooled on ice, and 16.72 g (96 mmol) of TDI dissolved in 15.00 g of NMP was added dropwise to the flask with keeping the temperature of the solution at a temperature of not higher than 30° C. After all the ingredients were added to the flask, the reaction was allowed to proceed at 30° C. for four hours. This solution was poured into 3 L of water, and the obtained precipitation was filtered out and then washed three times with 1.5 L of water. The washed solid was dried in a convection oven at 50° C. for three days to obtain the resin J as a solid, which did not have a structure represented by the general formula (2). The weight average molecular weight of the resin J was 40000.

Synthesis Example 11: Synthesis of Resin K

In a well-dried four-neck flask, 7.61 g (50 mmol) of 3,5'-DAB and 14.31 g (50 mmol) of MBAA were dissolved in 91.00 g of NMP with stirring under nitrogen atmosphere. Subsequently, the flask was cooled on ice, and 13.41 g (100 mmol) of isophthalaldehyde (manufactured by Tokyo Chemical Industry Co., Ltd., hereinafter referred to as IPA) dissolved in 15.00 g of NMP was added dropwise to the flask with keeping the temperature of the solution at a temperature of not higher than 30° C. After all the ingredients were added to the flask, the reaction was allowed to proceed at 30° C. for four hours. This solution was poured into 3 L of water, and the obtained precipitation was filtered out and then washed three times with 1.5 L of water. The washed solid was dried in a convection oven at 50° C. for three days to obtain the resin K as a solid, which had a structure represented by the general formula (3), wherein $R^5$—$(Z)_r$ in the general formula (3) had a structure represented by the general formula (4) at 50% by mole and a structure represented by the general formula (5) at 50% by mole and $R^6$ in the general formula (3) had a structure represented by the general formula (6) at 100% by mole. The weight average molecular weight of the resin K was 76000.

Synthesis Example 12: Synthesis of Resin L

In a well-dried four-neck flask, 16.22 g (75 mmol) of 3,3'-dihydroxybenzidine (hereinafter referred to as HAB) and 5.73 g (20 mmol) of MBAA were dissolved in 91.07 g of NMP with stirring under nitrogen atmosphere. Subsequently, the flask was cooled on ice, and 13.41 g (100 mmol) of IPA dissolved in 15.00 g of NMP was added dropwise to the flask with keeping the temperature of the solution at a temperature of not higher than 30° C. After all the ingredients were added to the flask, the reaction was allowed to proceed at 30° C. for four hours. This solution was poured into 3 L of water, and the obtained precipitation was filtered out and then washed three times with 1.5 L of water. The washed solid was dried in a convection oven at 50° C. for three days to obtain the resin L as a solid, which had a structure represented by the general formula (3), wherein $R^5$—$(Z)_r$ in the general formula (3) had a structure represented by the general formula (5) at 20% by mole and $R^6$ in the general formula (3) had a structure represented by the general formula (6) at 100% by mole. The weight average molecular weight of the resin L was 82000.

Synthesis Example 13: Synthesis of Resin M

In a well-dried four-neck flask, 12.88 g (45 mmol) of MBAA and 19.59 g (53.5 mmol) of 6FAP were dissolved in 152.71 g of NMP with stirring under nitrogen atmosphere. Subsequently, the flask was cooled on ice, and 23.43 g (100 mmol) of anthracene-9,10-dicarboxaldehyde (manufactured by Tokyo Chemical Industry Co., Ltd., hereinafter referred to as ADCA) dissolved in 15.00 g of NMP was added dropwise to the flask with keeping the temperature of the solution at a temperature of not higher than 30° C. After all the ingredients were added to the flask, the reaction was allowed to proceed at 30° C. for four hours. This solution was poured into 3 L of water, and the obtained precipitation was filtered out and then washed three times with 1.5 L of water. The washed solid was dried in a convection oven at 50° C. for three days to obtain the resin M as a solid, which had a structure represented by the general formula (3), wherein $R^5$—$(Z)_r$ in the general formula (3) had a structure represented by the general formula (5) at 46% by mole. The weight average molecular weight of the resin M was 57000.

Synthesis Example 14: Synthesis of Resin N

In a well-dried four-neck flask, 10.012 g (50 mmol) of 4,4'-DAE and 5.41 g (50 mmol) of PDA were dissolved in 70.29 g of NMP with stirring under nitrogen atmosphere. Subsequently, the flask was cooled on ice, and 13.01 g (97 mmol) of IPA dissolved in 15.00 g of NMP was added dropwise to the flask with keeping the temperature of the solution at a temperature of not higher than 30° C. After all the ingredients were added to the flask, the reaction was allowed to proceed at 30° C. for four hours. This solution was poured into 3 L of water, and the obtained precipitation was filtered out and then washed three times with 1.5 L of water. The washed solid was dried in a convection oven at 50° C. for three days to obtain the resin N as a solid. The weight average molecular weight of the resin N that did not have the structure represented by the formula (3) was 43000.

Synthesis Example 15: Synthesis of Resin O

In a well-dried four-neck flask, 28.63 g (100 mmol) of MBAA was dissolved in 178.06 g of NMP with stirring under nitrogen atmosphere. Subsequently, 21.59 g (99 mmol) of pyromellitic dianhydride (manufactured by Tokyo Chemical Industry Co., Ltd., hereinafter referred to as PMDA) was poured into the flask and the reaction was allowed to proceed at 40° C. for two hours. Then, the temperature was increased to 180° C. and the reaction was allowed to proceed for further six hours. This solution was poured into 3 L of water, and the obtained precipitation was filtered out and then washed three times with 1.5 L of water. The washed solid was dried in a convection oven at 50° C. for three days to obtain the resin O as a solid. The weight average molecular weight of the resin O was 51000.

The compositions and molecular weights of the resins of Synthesis Examples 1 to 15 are shown in Table 1.

TABLE 1

| | Resin | Structural unit contained in a resin | Diamine 1 | Equivalent of Diamine 1 | Diamine 2 | Equivalent of Diamine 2 | Acid chloride | Equivalent of Acid chloride | Weight average molecular weight |
|---|---|---|---|---|---|---|---|---|---|
| Synthesis Example 1 | Resin A | General formula (1) | MBAA | 100 mmol | — | — | IPC | 100 mmol | 75000 |
| Synthesis Example 2 | Resin B | General formula (1) | 3,5-DAB | 50 mmol | 4,4'-DAE | 50 mmol | IPC | 98 mmol | 56000 |
| Synthesis Example 3 | Resin C | General formula (1) | 6FAP | 90 mmol | 3,5-DAB | 10 mmol | TPC | 100 mmol | 80000 |
| Synthesis Example 4 | Resin D | General formula (1) | MBAA | 80 mmol | 4,4'-DAE | 18 mmol | NDCC | 100 mmol | 52000 |
| Synthesis Example 5 | Resin E | General formula (1) | 6FAP | 100 mmol | — | — | NDCC | 99.5 mmol | 61000 |
| Synthesis Example 6 | Resin F | | 4,4'-DAE | 100 mmol | — | — | IPC | 100 mmol | 77000 |

| | Resin | Structural unit contained in a resin | Diamine 1 | Equivalent of Diamine 1 | Diamine 2 | Equivalent of Diamine 2 | Diisocyanate | Equivalent of Diisocyanate | Weight average molecular weight |
|---|---|---|---|---|---|---|---|---|---|
| Synthesis Example 7 | Resin G | General formula (2) | MBAA | 100 mmol | — | — | TDI | 99.5 mmol | 66000 |
| Synthesis Example 8 | Resin H | General formula (2) | DABS | 85 mmol | PDA | 12.5 mmol | TDI | 100 mmol | 45000 |
| Synthesis Example 9 | Resin I | General formula (2) | 3,5-DAB | 70 mmol | 4,4'-DAE | 30 mmol | TODI | 95 mmol | 32000 |
| Synthesis Example 10 | Resin J | | 4,4'-DAE | 100 mmol | — | — | TDI | 96 mmol | 40000 |

TABLE 1-continued

|  |  | Structural unit contained in a resin | Diamine 1 | Equivalent of Diamine 1 | Diamine 2 | Equivalent of Diamine 2 | Dialdehyde | Equivalent of Dialdehyde | Weight average molecular weight |
|---|---|---|---|---|---|---|---|---|---|
| Synthesis Example 11 | Resin K | General formula (3) | 3,5-DAB | 50 mmol | MBAA | 50 mmol | IPA | 100 mmol | 76000 |
| Synthesis Example 12 | Resin L | General formula (3) | HAB | 75 mmol | MBAA | 20 mmol | IPA | 100 mmol | 82000 |
| Synthesis Example 13 | Resin M | General formula (3) | MBAA | 45 mmol | 6FAP | 53.5 mmol | ADCA | 100 mmol | 57000 |
| Synthesis Example 14 | Resin N |  | 4,4'-DAE | 50 mmol | PDA | 50 mmol | IPA | 97 mmol | 43000 |

|  |  | Structural unit contained in a resin | Diamine 1 | Equivalent of Diamine 1 | Diamine 2 | Equivalent of Diamine 2 | Acid dianhydride | Equivalent of Acid dianhydride | Weight average molecular weight |
|---|---|---|---|---|---|---|---|---|---|
| Synthesis Example 15 | Resin O |  | MBAA | 100 mmol | — | — | PMDA | 99 mmol | 51000 |

Example 1

In a flask, 2.45 g of sodium hydroxide and 49.81 g of water were mixed, and 10.00 g of the resin A was added thereto, and the resulting mixture was stirred at 40° C. to obtain an aqueous solution of the resin.

Example 2

An aqueous resin solution was obtained similarly to Example 1, except that 2.45 g of sodium hydroxide was changed to 13.00 g of sodium carbonate and the added amount of water was changed to 206.97 g.

Example 3

An aqueous resin solution was obtained similarly to Example 1, except that 2.45 g of sodium hydroxide was changed to 1.04 g of triethylamine and the added amount of water was changed to 20.50 g.

Example 4

An aqueous resin solution was obtained similarly to Example 1, except that the added amount of sodium hydroxide was changed to 0.245 g and the added amount of water was changed to 75.13 g.

Example 5

An aqueous resin solution was obtained similarly to Example 1, except that 2.45 g of sodium hydroxide was changed to 15.17 g of sodium carbonate and the added amount of water was changed to 94.68 g.

Example 6

An aqueous resin solution was obtained similarly to Example 1, except that the added amount of sodium hydroxide was changed to 32.70 g and the added amount of water was changed to 313.13 g.

Example 7

An aqueous resin solution was obtained similarly to Example 1, except that 10.00 g of the resin A was changed to 10.00 g of the resin B and 2.45 g of sodium hydroxide was changed to 2.12 g of sodium carbonate and the added amount of water was changed to 68.67 g.

Example 8

An aqueous resin solution was obtained similarly to Example 1, except that 10.00 g of the resin A was changed to 10.00 g of the resin C and 2.45 g of sodium hydroxide was changed to 3.69 g of triethylamine and the added amount of water was changed to 41.08 g.

Example 9

An aqueous resin solution was obtained similarly to Example 1, except that 10.00 g of the resin A was changed to 10.00 g of the resin D and the added amount of sodium hydroxide was changed to 2.47 g and the added amount of water was changed to 49.88 g.

Example 10

An aqueous resin solution was obtained similarly to Example 1, except that 10.00 g of the resin A was changed to 10.00 g of the resin E and 2.45 g of sodium hydroxide was changed to 2.27 g of potassium hydroxide and the added amount of water was changed to 22.79 g.

Comparative Example 1

An amount of 10.00 g of the resin A was mixed with 56.67 g of water to try to produce an aqueous solution of the resin. However, the resin was not dissolved and a uniform dispersion was obtained.

Examples 11 to 16 and Comparative Examples 2 to 7

Aqueous resin solutions were obtained similarly to Example 1, except that the resin, the basic compound, and the added amount of water were changed as indicated in Table 2.

The results of evaluating Examples 1 to 16 and Comparative Examples 1 to 7 are shown in Table 2.

TABLE 2

| | Resin | | Basic compound | | | Added amount of water | Concentration | Solubility and dispersibility | Storage stability | | Possible maximum film thickness (μm) | Adhesion test |
|---|---|---|---|---|---|---|---|---|---|---|---|---|
| | Variety | Contained structural unit | Added amount | Variety | Equivalent relative to the acidic groups in a resin | Added amount | | | | Room temperature storage | Refrigerated storage | | |
| Example 1 | Resin A | General formula (1) | 10.00 g | NaOH | 1.5 mole equivalents | 2.45 g | 49.81 g | 20% | dissolved | ○ | ○ | 20 | 85 |
| Example 2 | Resin A | General formula (1) | 10.00 g | Na$_2$CO$_3$ | 3.0 mole equivalents | 13.00 g | 206.97 g | 10% | dissolved | ○ | ○ | 20 | 87 |
| Example 3 | Resin A | General formula (1) | 10.00 g | NEt$_3$ | 0.25 mole equivalents | 1.04 g | 20.50 g | 35% | dissolved | ○ | separation | 16 | 81 |
| Example 4 | Resin A | General formula (1) | 10.00 g | NaOH | 0.15 mole equivalents | 0.245 g | 75.13 g | 12% | dissolved | ○ | separation | 12 | 84 |
| Example 5 | Resin A | General formula (1) | 10.00 g | Na$_2$CO$_3$ | 3.50 mole equivalents | 15.17 g | 94.68 g | 21% | dissolved | separation | ○ | 8 | 82 |
| Example 6 | Resin A | General formula (1) | 10.00 g | NaOH | 20.0 mole equivalents | 32.70 g | 313.13 g | 12% | dissolved | ○ | ○ | 4 | 79 |
| Comparative Example 1 | Resin A | General formula (1) | 10.00 g | none | — | — | 56.67 g | 15% | uniformly dispersed | ○ | ○ | 12 | 76 |
| Example 7 | Resin B | General formula (1) | 10.00 g | Na$_2$CO$_3$ | 1.5 mole equivalents | 2.12 g | 68.67 g | 15% | dissolved | ○ | ○ | 16 | 81 |
| Example 8 | Resin C | General formula (1) | 10.00 g | NEt$_3$ | 2.0 mole equivalents | 3.69 g | 41.08 g | 25% | dissolved | ○ | separation | 16 | 82 |
| Example 9 | Resin D | General formula (1) | 10.00 g | NaOH | 2.0 mole equivalents | 2.47 g | 49.88 g | 20% | dissolved | ○ | separation | 16 | 87 |
| Example 10 | Resin E | General formula (1) | 10.00 g | KOH | 2.5 mole equivalents | 2.27 g | 22.79 g | 35% | dissolved | separation | separation | 12 | 89 |
| Comparative Example 2 | Resin F | General formula (1) | 10.00 g | NaOH | 2.0 mole equivalents | 2.45 g | 49.81 g | 20% | precipitated | — | — | — | — |
| Example 11 | Resin G | General formula (2) | 10.00 g | Na$_2$CO$_3$ | 2.0 mole equivalents | 9.22 g | 108.94 g | 15% | dissolved | ○ | ○ | 20 | 83 |
| Comparative Example 3 | Resin G | General formula (2) | 10.00 g | none | — | — | 56.67 g | 15% | uniformly dispersed | ○ | ○ | 10 | 72 |
| Example 12 | Resin H | General formula (2) | 10.00 g | NaOH | 3.0 mole equivalents | 4.79 g | 34.51 g | 30% | dissolved | ○ | separation | 16 | 82 |
| Example 13 | Resin I | General formula (2) | 10.00 g | Na$_2$CO$_3$ | 2.0 mole equivalents | 3.55 g | 54.21 g | 20% | dissolved | ○ | separation | 16 | 86 |
| Comparative Example 4 | Resin J | | 10.00 g | pyridine | — | 11.00 g | 49.81 g | 20% | precipitated | — | — | — | — |
| Example 14 | Resin K | General formula (3) | 10.00 g | NaOH | 1.5 mole equivalents | 2.55 g | 37.64 g | 25% | dissolved | ○ | ○ | 20 | 66 |
| Comparative Example 5 | Resin K | General formula (3) | 10.00 g | none | — | — | 40.00 g | 20% | uniformly dispersed | ○ | ○ | 11 | 56 |
| Example 15 | Resin L | General formula (3) | 10.00 g | NaOH | 2.0 mole equivalents | 4.30 g | 57.21 g | 20% | dissolved | ○ | separation | 16 | 61 |

TABLE 2-continued

| | Resin | | | Basic compound | | | | | Solubility and dispersibility | Storage stability | | Possible maximum film thickness (μm) | Adhesion test |
|---|---|---|---|---|---|---|---|---|---|---|---|---|---|
| | | | | | Equivalent relative to the acidic groups in a resin | | | | | Room temperature storage | Refrigerated storage | | |
| | Variety | Contained structural unit | Added amount | Variety | | Added amount | Added amount of water | Concentration | | | | | |
| Example 16 | Resin M | General formula (3) | 10.00 g | Na$_2$CO$_3$ | 2.5 mole equivalents | 9.34 g | 174.04 g | 10% | dissolved | ○ | separation | 16 | 68 |
| Comparative Example 6 | Resin N | | 10.00 g | NaHCO$_3$ | — | 2.45 g | 49.81 g | 20% | precipitated | — | — | — | — |
| Comparative Example 7 | Resin O | | 10.00 g | NaOH | 2.5 mole equivalents | 4.29 g | 80.97 g | 15% | dissolved | ○ | separation | 15 | 38 |

Example 17

To 50.00 g of the aqueous resin solution obtained in Example 1, 10.00 g of acetylene black (manufactured by Denki Kagaku Kogyo K.K.) was added, and the resulting mixture was stirred with a homogenizing disperser. Furthermore, 180.00 g of silicon oxide powder (manufactured by Sigma-Aldrich Co. LLC) was added to the mixture, and then 260 g of water was added portionwise to the mixture with stirring to obtain a negative electrode paste. This negative electrode paste was applied on copper foil (manufactured by Fukuda Metal Foil & Powder Co., Ltd.) with a doctor blade. The copper foil coated with the negative electrode paste was heat-treated in an inert oven (manufactured by Koyo Thermo Systems Co., Ltd., INH-9) with nitrogen gas flow at an oxygen concentration of not more than 20 ppm, in which the copper foil was heated at 50° C. for 30 minutes, and then heated to 150° C. at a rate of 3.5° C./min and heated at 150° C. for one hour. Subsequently, once the temperature in the oven was dropped to 80° C. or lower, the copper foil was withdrawn to obtain a negative electrode.

The invention claimed is:
1. A binder composition containing:
   (a) a resin comprising a polymer having a structure represented by any one of the following general formulae (1) to (3) and/or a copolymer having said structure; and
   (b) a basic compound

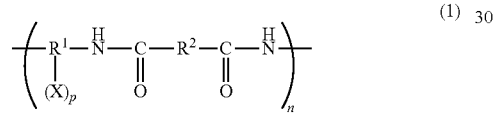

wherein in general formula (1),
$R^1$ represents a $C_4$-$C_{30}$ organic group having a valence of two to six,
$R^2$ represents a divalent $C_4$-$C_{30}$ organic group,
X represents a sulfonic group, hydroxy group, or carboxy group,
p represents an integer of 1 to 4, and
n is within the range from 2 to 100,000;

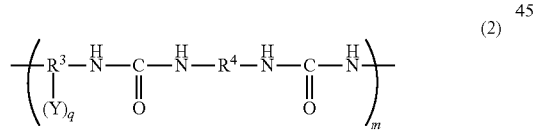

wherein in general formula (2),
$R^3$ represents a $C_4$-$C_{30}$ organic group having a valence of two to six,
$R^4$ represents a divalent $C_4$-$C_{30}$ organic group,
Y represents a sulfonic group, hydroxy group, or carboxy group,
q represents an integer of 1 to 4, and
m is within the range from 2 to 100,000;

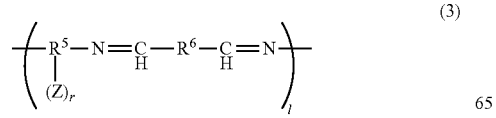

wherein in general formula (3),
$R^5$ represents a $C_4$-$C_{30}$ organic group having a valence of two to six,
$R^6$ represents a divalent $C_4$-$C_{30}$ organic group,
Z represents a sulfonic group, hydroxy group, or carboxy group,
r represents an integer of 1 to 4, and
l is within the range from 2 to 100,000;
wherein $R^2$ in the general formula (1), $R^4$ in the general formula (2), and $R^6$ in the general formula (3) each has a structure represented by the following general formula (6) at not less than 20% by mole

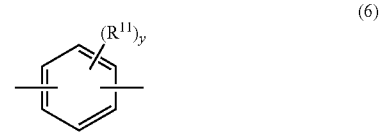

wherein in general formula (6),
each $R^{11}$ independently represents a halogen atom or a monovalent $C_1$-$C_8$ organic group, and
y represents an integer of 0 to 4;
wherein $R^1$—$(X)_p$ in the general formula (1), $R^3$—$(Y)_q$ in the general formula (2), and $R^5$—$(Z)_r$ in the general formula (3) each has a structure represented by the following general formula (4) or (5) at not less than 20% by mole

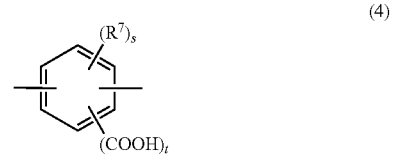

wherein in above general formula (4),
$R^7$ represents a halogen atom or a monovalent $C_1$-$C_8$ organic group,
s represents an integer of 0 to 3, and
t represents 1 or 2;

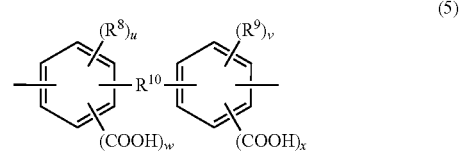

wherein in general formula (5),
$R^8$ and $R^9$ each independently represents a halogen atom or a monovalent $C_1$-$C_8$ organic group,
u and v each represents an integer of 0 to 3,
w and x each independently represents 1 or 2, and
$R^{10}$ represents a single bond, O, S, NH, $SO_2$, CO, or a divalent $C_1$-$C_3$ organic group, or a divalent cross-linking structure formed by linking two or more thereof;
wherein $R^1$—$(X)_p$, $R^3$—$(Y)_q$, and $R^5$—$(Z)_r$ each has a structure represented by the general formula (4) or (5) at not less than 50% by mole; and wherein the resin and the basic compound are dissolved or dispersed in a solvent that comprises water as a primary ingredient, to form the binder composition.

2. The binder composition according to claim 1, wherein the resin (a) comprises a copolymer having a structure represented by said general formula (1) and a structure represented by either said general formula (2) or (3).

3. A slurry comprising the binder composition according to claim 1 and a filler.

4. The slurry according to claim 3, wherein the filler comprises at least one element selected from the group consisting of carbon, manganese, cobalt, nickel, iron, silicon, titanium, tin, and germanium.

5. The slurry according to claim 3, wherein the filler comprises silicon and silicon oxide at not less than 10% by mass in total taking the overall amount of the filler as 100% by mass.

6. The slurry according to claim 3, wherein the filler comprises lithium titanate.

7. The slurry according to claim 3, wherein the filler is dispersed in water or a water-soluble solvent.

8. A method of producing a filler-containing resin film, the method comprising the steps of: applying the slurry according to claim 3 on either side or both sides of a support substrate to form a coated film, and drying the coated film.

9. A method of producing an electrode for a secondary battery or a capacitor, the method comprising the step of forming the filler-containing resin film produced by the method according to claim 8 on at least either of positive and negative electrode current collectors.

10. A secondary battery or capacitor prepared by alternately and plurally stacking positive and negative electrodes produced by the method according to claim 9, wherein a separator is inserted between the positive and negative electrodes.

11. A filler-containing resin film comprising the binder composition according to claim 1 and a filler that comprises at least one element selected from the group consisting of carbon, manganese, cobalt, nickel, iron, silicon, titanium, tin, and germanium.

12. An electrode for a secondary battery or a capacitor, wherein the filler-containing resin film according to claim 11 is applied on at least either of positive and negative electrodes.

13. The binder composition according to claim 1, wherein $R^2$, $R^4$, and $R^6$ each has a structure represented by the general formula (6) at not less than 80% by mole.

14. The binder composition according to claim 1, wherein the content of the basic compound is not less than 0.2 mole equivalents relative to the acidic functional groups in the resin.

15. The binder composition according to claim 1, wherein the basic compound is sodium hydroxide or sodium carbonate.

16. A binder composition containing:
(a) a resin comprising a polymer having a structure represented by any one of the following general formulae (1) to (3) and/or a copolymer having said structure; and
(b) a basic compound

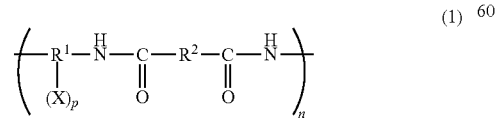

wherein in general formula (1),
$R^1$ represents a $C_4$-$C_{30}$ organic group having a valence of two to six,
$R^2$ represents a divalent $C_4$-$C_{30}$ organic group,
X represents a sulfonic group, hydroxy group, or carboxy group,
p represents an integer of 1 to 4, and
n is within the range from 2 to 100,000;

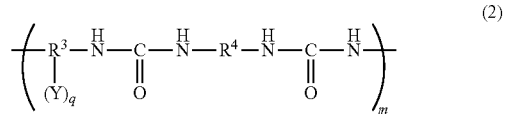

wherein in general formula (2),
$R^3$ represents a $C_4$-$C_{30}$ organic group having a valence of two to six,
$R^4$ represents a divalent $C_4$-$C_{30}$ organic group,
Y represents a sulfonic group, hydroxy group, or carboxy group,
q represents an integer of 1 to 4, and
m is within the range from 2 to 100,000;

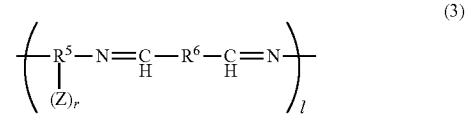

wherein in general formula (3),
$R^5$ represents a $C_4$-$C_{30}$ organic group having a valence of two to six,
$R^6$ represents a divalent $C_4$-$C_{30}$ organic group,
Z represents a sulfonic group, hydroxy group, or carboxy group,
r represents an integer of 1 to 4, and
l is within the range from 2 to 100,000;
wherein $R^2$ in the general formula (1), $R^4$ in the general formula (2), and $R^6$ in the general formula (3) each has a structure represented by the following general formula (6) at not less than 20% by mole

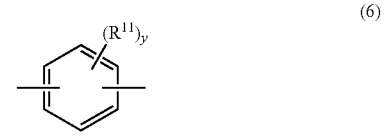

wherein in general formula (6),
each $R^{11}$ independently represents a halogen atom or a monovalent $C_1$-$C_8$ organic group, and
y represents an integer of 0 to 4;
wherein $R^2$, $R^4$, and $R^6$ each has a structure represented by the general formula (6) at not less than 80% by mole; and
wherein the resin and the basic compound are dissolved or dispersed in a solvent that comprises water as a primary ingredient, to form the binder composition.

* * * * *